(12) United States Patent
Will et al.

(10) Patent No.: US 6,920,425 B1
(45) Date of Patent: Jul. 19, 2005

(54) VISUAL INTERACTIVE RESPONSE SYSTEM AND METHOD TRANSLATED FROM INTERACTIVE VOICE RESPONSE FOR TELEPHONE UTILITY

(75) Inventors: Craig A. Will, Long Barn, CA (US); Wayne N. Shelley, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/572,384

(22) Filed: May 16, 2000

(51) Int. Cl.[7] ............................................. G10L 15/26
(52) U.S. Cl. ..................... 704/275; 704/235; 379/88.13
(58) Field of Search ........................... 379/88.13, 88.14; 704/235, 270, 275

(56) References Cited

U.S. PATENT DOCUMENTS

| | | | | |
|---|---|---|---|---|
| 5,051,924 A | * | 9/1991 | Bergeron et al. | 704/200 |
| 5,450,470 A | * | 9/1995 | Alheim | 379/52 |
| 5,524,137 A | * | 6/1996 | Rhee | 379/88.01 |
| 5,583,922 A | * | 12/1996 | Davis et al. | 379/93.09 |
| 5,912,952 A | * | 6/1999 | Brendzel | 379/93.25 |
| 5,937,040 A | * | 8/1999 | Wrede et al. | 379/93.23 |
| 5,956,298 A | * | 9/1999 | Gough | 369/29.01 |
| 5,960,072 A | * | 9/1999 | Hird et al. | 379/132 |
| 6,091,805 A | * | 7/2000 | Watson | 379/93.17 |
| 6,330,311 B1 | * | 12/2001 | Mijares, Jr. et al. | 379/112.01 |
| 6,493,428 B1 | * | 12/2002 | Hillier | 379/67.1 |
| 6,594,484 B1 | * | 7/2003 | Hitchings, Jr. | 455/414.1 |

OTHER PUBLICATIONS

Nortel Networks, Nortel Networks i2004 Internet Telephone, Product Brief, Year 2000, 2 pages, Ontario, Canada.
Voice XML Forum, Voice eXtensible Markup Language VoiceXML Version 1.00, Mar. 7, 2000, 101 pages.
Wireless Application Protocol Forum, LTD. Wireless Application Protocol Wireless Markup Language Specification Version 1.3, Year 2000, 110 pages.

* cited by examiner

Primary Examiner—Richemond Dorvil
Assistant Examiner—Donald L. Storm
(74) Attorney, Agent, or Firm—Dennis R. Haszko; Jeffrey M. Measures; Borden Ladner Gervais LLP

(57) ABSTRACT

A system, method, and computer readable medium storing a software program for translating a script for an interactive voice response system to a script for a visual interactive response system. The visual interactive response system executes the translated visual-based script when a user using a display telephone calls the visual interactive response system. The visual interactive response system then transmits a visual menu to the display telephone to allow the user to select a desired response, which is subsequently sent back to the visual interactive response system for processing. The voice-based script may be defined in voice extensible markup language and the visual-based script may be defined in wireless markup language, hypertext markup language, or handheld device markup language. The translation system and program includes a parser for extracting command structures from the voice-based script, a visual-based structure generator for generating corresponding command structure for the visual-based script, a text prompt combiner for incorporating text translated from voice prompts into command structure generated by the structure generator, an automatic speech recognition routine for automatically converting voice prompts into translated text, and an editor for editing said visual-based script.

26 Claims, 14 Drawing Sheets

US 6,920,425 B1

VISUAL INTERACTIVE RESPONSE SYSTEM AND METHOD TRANSLATED FROM INTERACTIVE VOICE RESPONSE FOR TELEPHONE UTILITY

FIELD OF THE INVENTION

This invention relates generally to telecommunications, and in particular, to a system and method for deriving a visual interface response for a telephone set that has a display from an existing interactive voice response system.

BACKGROUND OF THE INVENTION

An undesirable characteristic of current automated telephone voice response systems (typically known as Interactive Voice Response, or IVR systems) is their poor usability. These systems are ubiquitous but are generally disliked by users. Companies that implement them are aware of this, but do it to save the considerable costs of having humans handle callers directly.

There are a variety of drawbacks relating to the poor usability of interactive voice response (IVR) systems. Most result from the use of voice as a media. Typically, users have to listen to a series of voice menus (e.g., "Press 1 to speak with Marketing, Press 2 for Sales, Press 3 for Finance . . ."). Menus are often necessarily long because of the complexity of the different choices. In this case, users often forget some of the choices, or the particular key required for a choice, by the time the last menu item is presented. Often, users end up performing an extremely complex mental task, such as memorizing the menu items and corresponding responses while simultaneously trying to decide whether their problem fits, for example, in "Marketing" or "Sales".

Recently introduced display telephones, such as the Nortel M3900 series, allow text and graphics to be presented on a display. For instance, such display telephones can access websites and other sources of digital data through a network, and display the accessed information on the display telephone. Such telephones typically consist of a basic digital telephone plus a liquid crystal display for displaying textual and graphical menus, arrow keys or some other means of moving up and down and often left and right in menus, and "soft keys" i.e., keys to the bottom, top and/or sides of the display whose meaning changes with the display context, and for which labels are displayed adjacent to the keys.

A problem of changing over to a visual-based telephone interactive system, however, is the very large installed based of interactive voice response (IVR) systems. It will be very costly to manually convert these voice-based systems to visual-based systems that will work with display telephones. This is particularly the case with systems that were built some time ago and have proprietary interfaces with databases, particularly mainframe computers.

FIG. 1 illustrates an exemplary prior art telecommunications system 100 that uses an interactive voice response (IVR) system. The telecommunications system 100 consists of a plurality of telephones 102, which when dialed, connect to an interactive voice response (IVR) system 106 by way of a public switched telephone network (PSTN) 104. The interactive voice response (IVR) system 106, in turn, is typically connected to a database 108 that allows information to be retrieved, such as bank balances, credit card status, information about stocks, etc.

There is a significant need for approaches that can help convert existing interactive voice response (IVR) systems, including particularly the programming of the interactive voice response (IVR) system itself and interfaces to existing databases, to allow them to be used for visual interactive response systems that can be used with display telephones, including both desktop display telephones and wireless display telephones.

SUMMARY OF THE INVENTION

A system, method, and computer readable medium storing a software program for translating a script for an interactive voice response system to a script for a visual interactive response system. The visual interactive response system executes the translated visual-based script when a user using a display telephone calls the visual interactive response system. The visual interactive response system then transmits a visual menu to the display telephone to allow the user to select a desired response, which is subsequently sent back to the visual interactive response system for processing. The voice-based script may be defined in voice extensible markup language and the visual-based script may be defined in wireless markup language, hypertext markup language, or handheld device markup language.

The translation system and program includes a parser for extracting command structures from the voice-based script, a visual-based structure generator for generating corresponding command structure for the visual-based script, a text prompt combiner for incorporating text translated from voice prompts into command structure generated by the structure generator, an automatic speech recognition routine for automatically converting voice prompts into translated text, and an editor for editing said visual-based script.

DETAILED DESCRIPTION OF THE INVENTION

Figure 1:
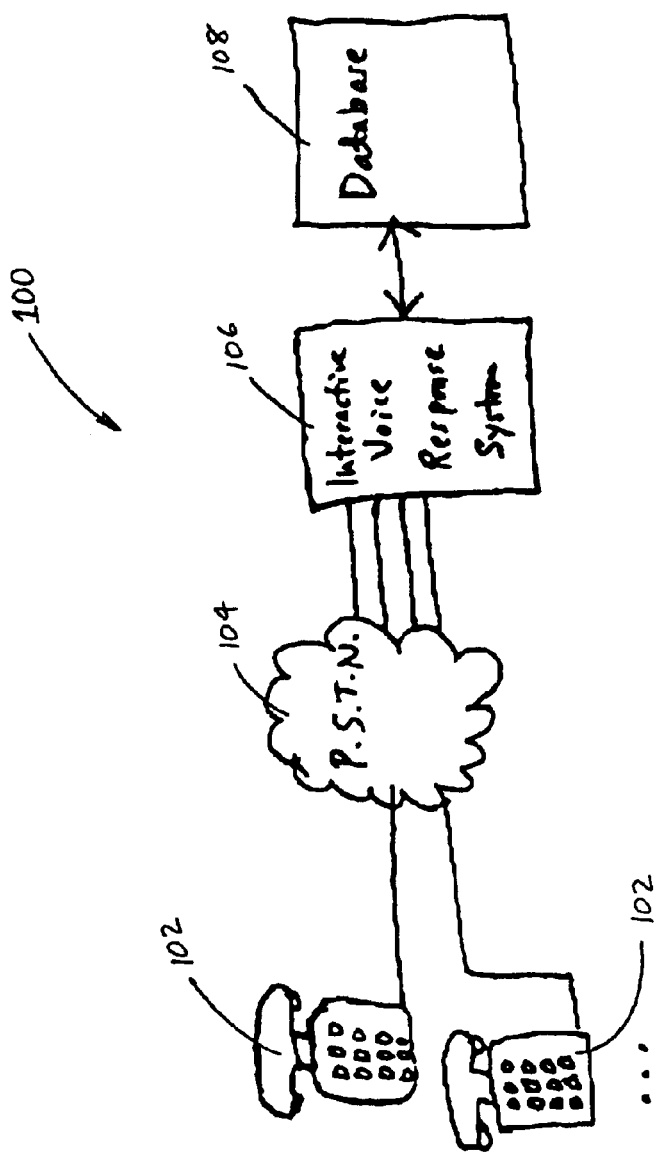
FIG. 1 illustrates an exemplary prior art telecommunications system that uses an interactive voice response (IVR) system.
Figure 2:
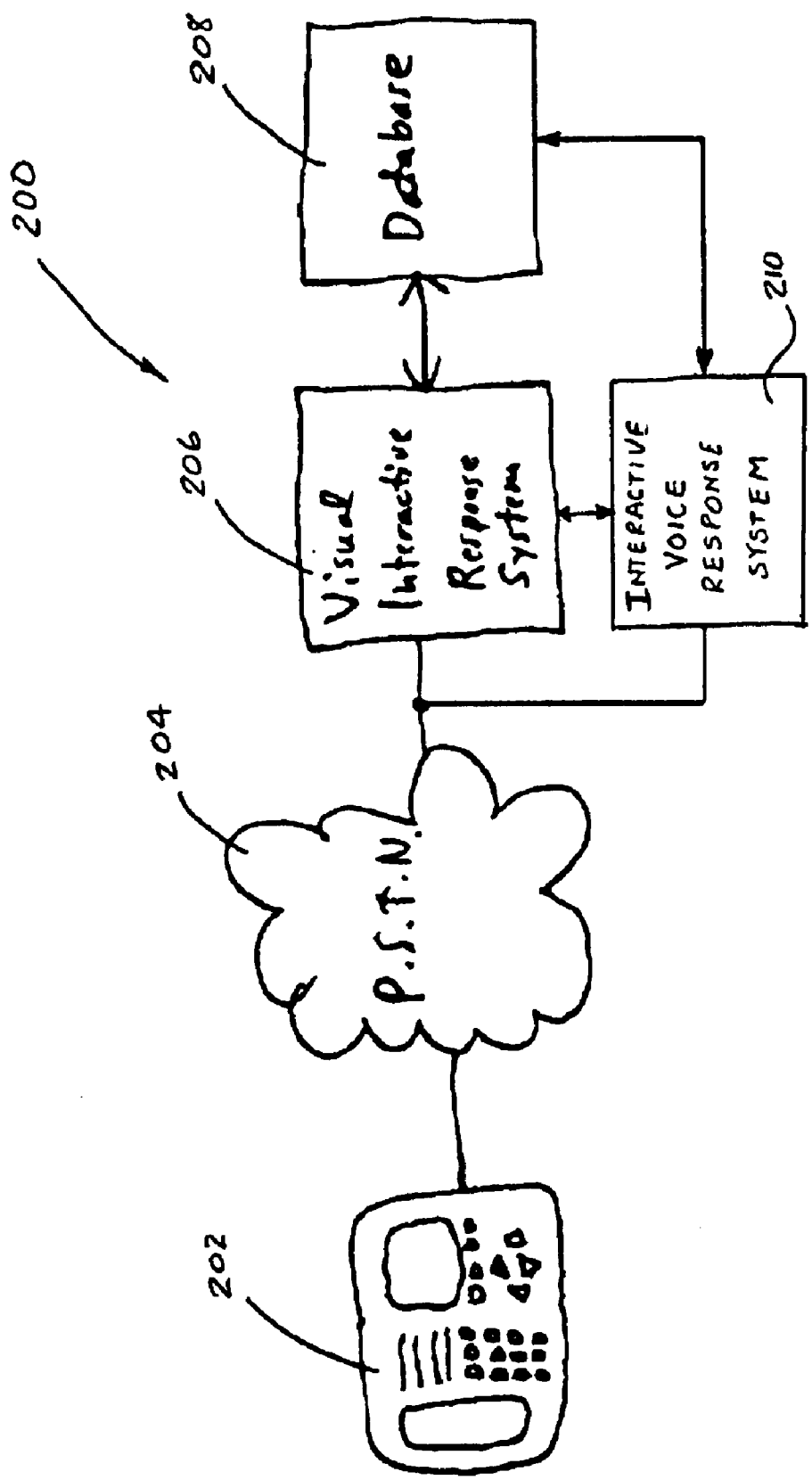
FIG. 2 illustrates a block diagram of an exemplary telephone system using a visual interactive response (VIR) system in accordance with the invention.

FIG. 2 illustrates a block diagram of an exemplary telecommunications system 200 using a visual interactive response (VIR) system in accordance with the invention. The telecommunications system 200 comprises a display telephone 202, a public switched telephone network (PSTN) 204, a visual interactive response (VIR) system 206 in accordance with the invention, and a database 208. With this system 200, a user using the display telephone 202 dials the telephone number associated with the visual interactive response (VIR) system 206 and connects thereto by way of the public switched telephone network (PSTN) 204. More specifically, the display telephone 202 is connected to a port on a computer system (e.g. a server) running the visual interactive response (VIR) system 206 that receives data from and transmits data to the display telephone 202 via an appropriate digital communications protocol, such as the Analog Display Services Interface (ADSI).

The ADSI protocol is based on an industry standard developed by Bell Communication Research. In the protocol, formats are defined for a display that can be scrolled and includes softkeys, both intended to allow the provision of interactive services via the display. See, for example, U.S. Pat. No. 5,615,247 to Pezzullo, et al. and assigned to Northern Telecom (now Nortel Networks). This protocol is based on a technique described in U.S. Pat. No. 5,263,084 to Chaput, et-al., also assigned to Northern Telecom. In the protocol, data bursts are transmitted to a telephone subscriber terminal while the terminal is off-hook, allowing the terminal to simultaneously provide interactive data services while at the same time providing voice communication. At a higher level, the formatting of screens and definition of response keys can be done in many ways, including using Hypertext Transport Protocol (HTTP) or a similar protocol if a browser based on Hypertext Markup Language (HTML) or Wireless Markup Language (WML) is included in the telephone set.

Once the display telephone 202 is connected to the visual interactive response (VIR) system 206, the visual interactive response system 206 sends a visual menu to the display telephone 202 via the digital protocol. The user then accesses the desired selection of the visual menu by pressing one or more keys on the display telephone 202. A code identifying the selection is then sent back to the visual interactive response system 206 via the digital protocol for performing various pre-programmed functions. Such functions include accessing certain information residing on the database 208, prompting the user at the display telephone 202 for more information, and possibly writing information to the database 208.

Alternatively, the exemplary telephone system 200 may optionally include a traditional interactive voice response (IVR) system 210 in combination with the visual interactive response system 206 of the invention. In this case, the IVR/VIR system answers a call and pauses for a predetermined amount of time to wait for a transmission from the display telephone 202. If the display telephone 202 is detected, it will send a menu in visual form back to the display telephone 202. If the display telephone is not detected within the pre-determined amount of time, the IVR/VIR system assumes the call is from an ordinary non-display telephone, and a traditional voice prompt is presented.

The database 208 can be connected directly to the visual interactive response system 208 and/or the interactive voice response (IVR) system 210, or remotely thereto by an Ethernet or other network protocol, Intranet wide area network, Internet, a dedicated line, or a dial-up traditional communication line with modem.

Figure 3:
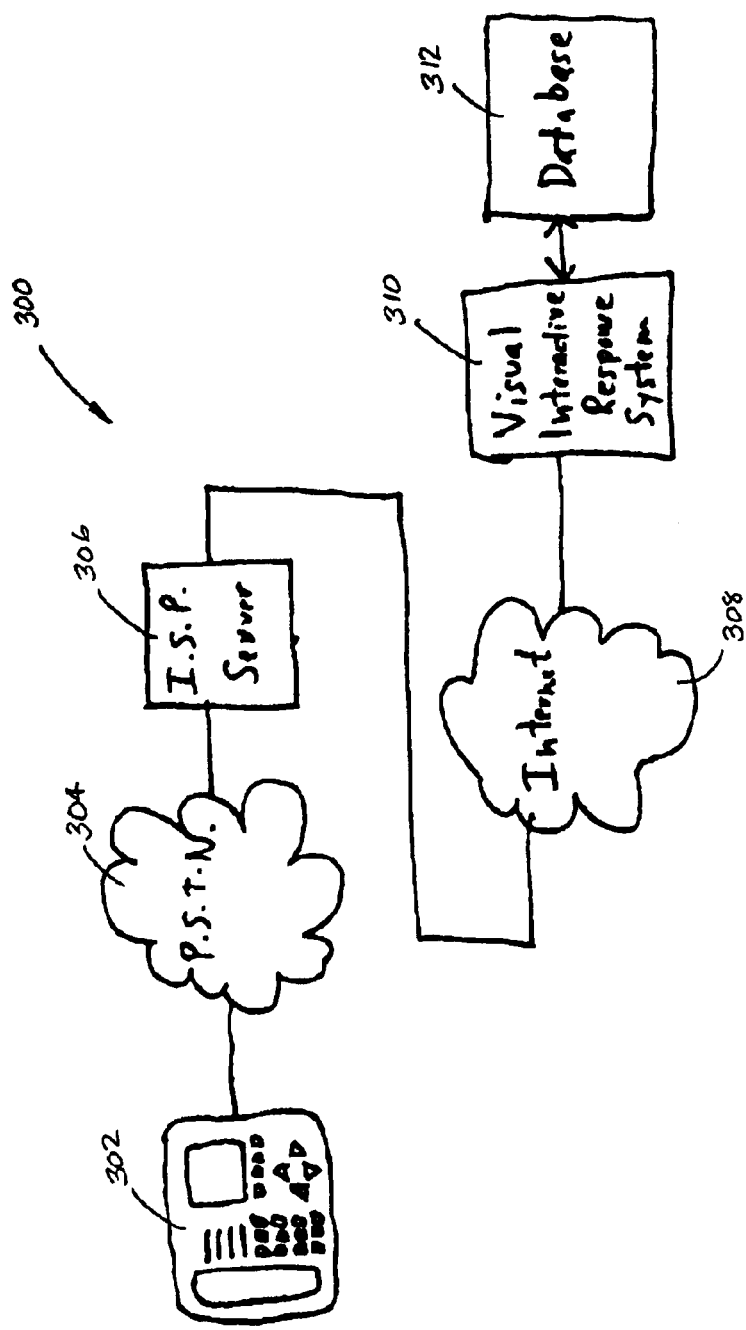
FIG. 3 illustrates a block diagram of another exemplary telephone system using a visual interactive response (VIR) system in accordance with the invention.

FIG. 3 illustrates a block diagram of another exemplary telecommunications system 300 using a visual interactive response (VIR) system in accordance with the invention. The telecommunications system 300 comprises a display telephone 302, a public switched telephone network (PSTN) 304, a network access server 306 such as an Internet Service Provider (ISP), a packet switched network 308 such as the Internet, a visual interactive response (VIR) system 310 in accordance with the invention, and a database 312. The database 312 can be connected directly to the visual interactive response system 310, or remotely thereto by an Ethernet or other network protocol, Intranet wide area network, Internet, a dedicated line, or a dial-up traditional communication line with modem.

In operation, a user using the display telephone 302 dials the telephone number associated with the Internet Service Provider (ISP) 306 via the public switched telephone network (PSTN) 304, or alternatively, establishes a connection with the Internet Service Provider (ISP) 306 by using a dedicated line, such as through cable telephone system or a Digital Subscriber Line (DSL) connection. Once connected to the Internet Service Provider (ISP) 306, the user using the display telephone 302 connects to the visual interactive response (VIR) system 310 by dialing a telephone number (using appropriate communications message, such as Internet Protocol SIP or H.323) or by accessing a website associated with the visual interactive response system 310. Such a connection may be invisible to the user, the result of choosing a selection from the menu of a portal.

When the display telephone 302 is connected to the visual interactive response system 310, the visual interactive response (VIR) system 310 sends a visual menu to the display telephone 302 via the digital protocol. The user then accesses the desired selection of the visual menu by pressing one or more keys on the display telephone 302. A code identifying the selection is then sent back to the visual interactive response system 310 via the digital protocol for performing various pre-programmmed functions. Such functions include accessing certain information residing on the database 312, prompting the user at the display telephone 302 for more information, and possibly writing information to the database 312.

Figure 4:
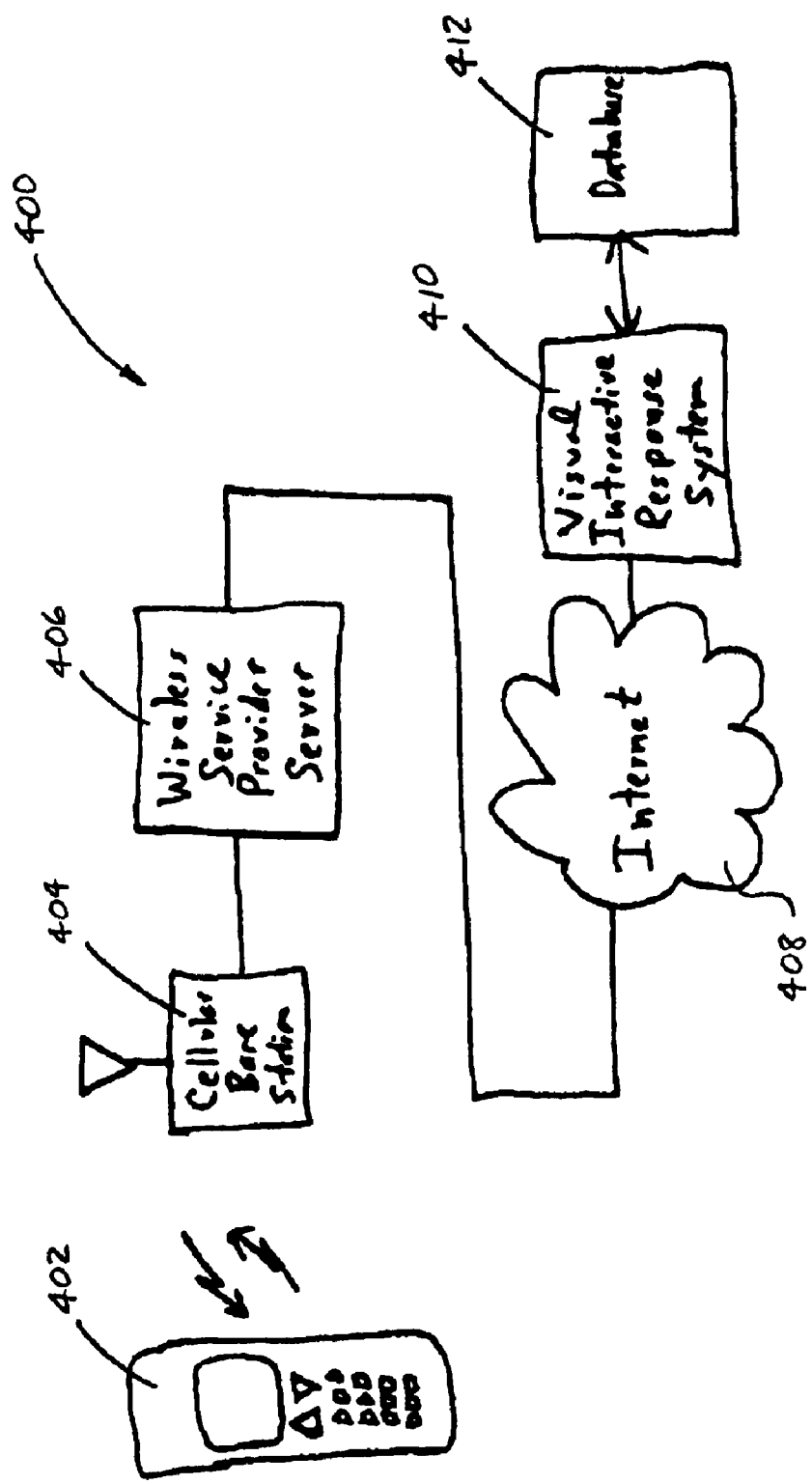
FIG. 4 illustrates a block diagram of yet another exemplary telephone system using a visual interactive response (VIR) system in accordance with the invention.

FIG. 4 illustrates a block diagram of yet another exemplary telecommunications system 400 using a visual interactive response (VIR) system in accordance with the invention. The telecommunications system 400 comprises a cellular telephone 402, a cellular base station 404, a network server 406 such as a wireless service provider server, a packet switched network 408 such as the Internet, a visual interactive response (VIR) system 410 in accordance with the invention, and a database 412. The cellular telephone 402 connects to the cellular base station 404 by radio, and the base station 404 connects to the network server 406 through the wireless service provider 406.

The network server 406 is connected by wire or optical fiber to a router (not shown) which connects it to the Internet 408. The Internet 408, in turn, is connected to a router (not shown) that connects it to a server that runs the visual interactive response (VIR) system 410. The visual interactive response system 410, when necessary, connects to the database 412 to retrieve and/or store information. The database 412 can be connected directly to the visual interactive response system 410, or remotely thereto by an Ethernet or other network protocol, Intranet wide area network, Internet, a dedicated line, or a dial-up traditional communication line with modem.

In operation, a user using the cellular telephone 402 dials the telephone number associated with the wireless service provider server 406 and is subsequently connected thereto by way of the cellular base station 404. Once connected to the wireless service provider server 406, the user using the cellular telephone 402 connects to the visual interactive response (VIR) system 410 by dialing a telephone number (using appropriate communications message, such as Internet Protocol SIP or H.323) or by accessing a website associated with the visual interactive response system 410.

When the cellular telephone 402 is connected to the visual interactive response system 410, the visual interactive response (VIR) system 410 sends a visual menu to the cellular telephone 402 via the digital protocol, which may include several layers of the Wireless Access Protocol, including Wireless Markup Language (WML) as the highest level layer. The user then accesses the desired selection of the visual menu by pressing one or more keys on the cellular telephone 402. A code identifying the selection is then sent back to the visual interactive response system 410 via the digital protocol for performing various pre-programmed functions. Such functions include accessing certain information residing on the database 412, prompting the user at the cellular telephone 402 for more information, and possibly writing information to the database 412.

Figure 5:
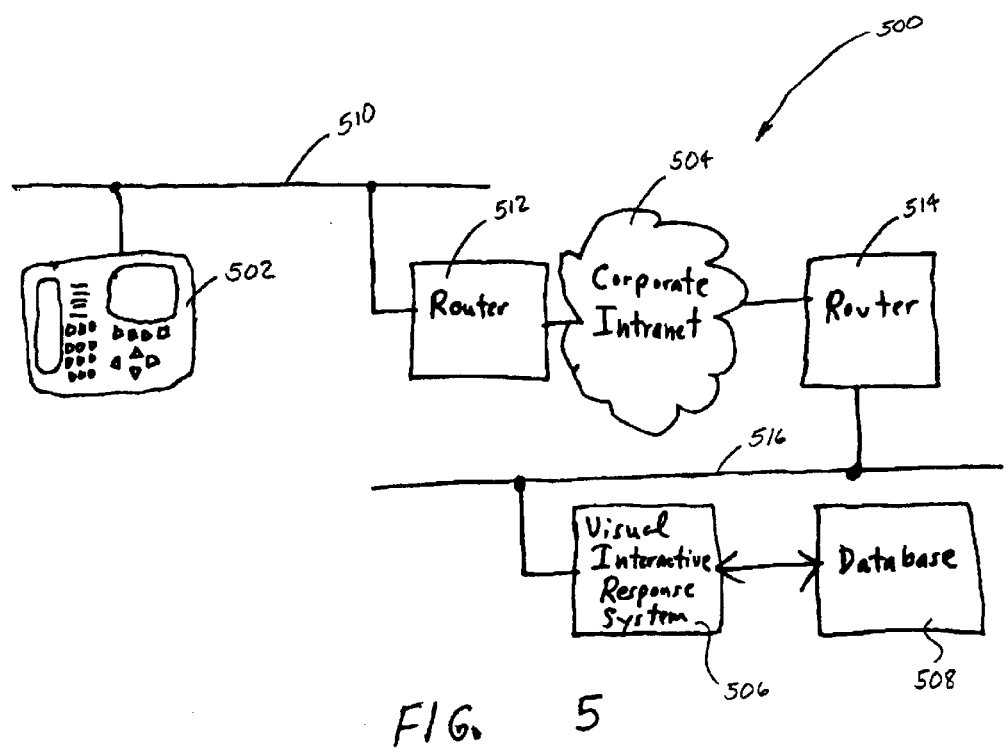
FIG. 5 illustrates a block diagram of still another telephone system using a visual interactive response system in accordance with the invention.

FIG. 5 illustrates a block diagram of still another telecommunications system 500 using a visual interactive response system in accordance with the invention. The telecommunications system 500 comprises a network telephone 502 (e.g. a Nortel Networks model i2004 Etherphone), a packet switched network 504 such as a corporate intranet or the Internet with possibly an appropriate encryption or other measures to insure privacy, a visual interactive response system 506 in accordance with the invention, and a database 508. The network telephone 502 is connected to the packet switched network 504 via a network line 510 (e.g. an Ethernet line) and a router 512 (and possibly through a series of additional hubs and/or routers).

The packet switched network 504 connects to the visual interactive response system 506 via a router 514 (and possibly through a series of additional hubs and/or routers) and a network line 516 (e.g. an Ethernet line) to a server that runs the visual interactive response system 506. As was described above, the visual interactive response system 506, when necessary, connects to the database 508 to retrieve and/or store information. The database 508 may be directly connected on the same computer system that runs the visual interactive response system, or it may run on a separate system. In the latter case, it may be connected via an Ethernet, Intranet wide area network, internet, or a dedicated or dial-up traditional communication line with modem.

In operation, a user using the network telephone 502 dials the telephone number or enters the URL associated with the visual interactive response (VIR) system 506, or chooses the visual interactive response system from a menu of available applications. The network telephone 502 is subsequently connected to the visual interactive response (VIR) system 506 via the Ethernet line 510, the router 512 (and possibly through a series of additional hubs and/or routers), the packet switched network 504, the router 514 (and possibly through a series of additional hubs and/or routers), and the Ethernet line 516 connected to the computer system 506 running the visual interactive response (VIR) system 506.

When the network telephone 502 is connected to the visual interactive response system 506, the visual interactive response (VIR) system 506 sends a visual menu to the network telephone 502 via a digital protocol, such as a Hypertext Markup Language (HTML) or Wireless Markup Language (WML). The user then accesses the desired selection of the visual menu by pressing one or more keys on the network telephone 502. A code identifying the selection is then sent back to the visual interactive response system 506 via the digital protocol for performing various pre-programmed functions. Such functions include accessing certain information residing on the database 508, prompting the user at the network telephone 502 for more information, and possibly writing information to the database 508.

Figure 6:
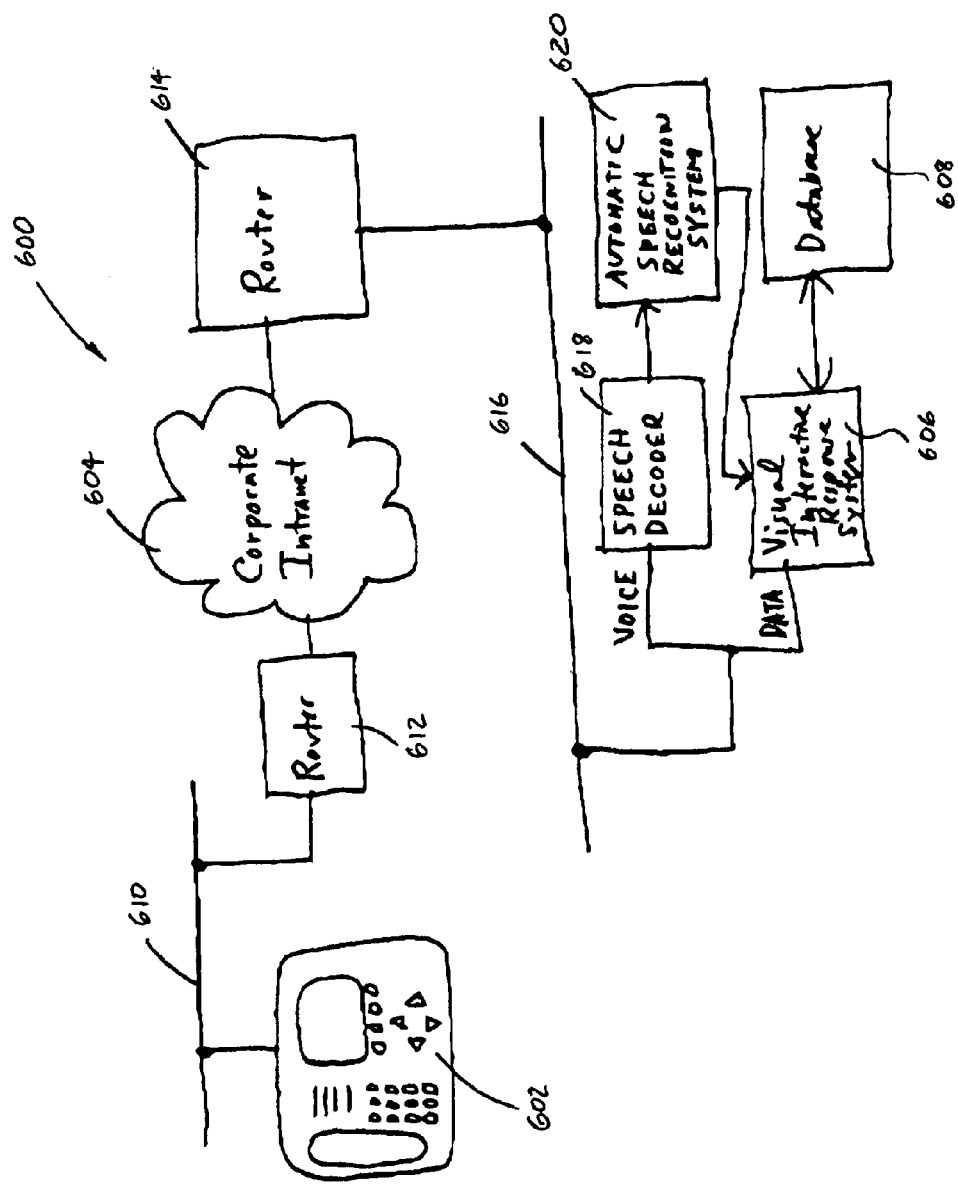
FIG. 6 illustrates an exemplary display telephone which can be used to communicate with visual interactive response system in accordance with the invention.

FIG. 6 illustrates a block diagram of a telecommunications system 600 using a visual interactive response system having an automatic speech recognition system in accordance with the invention. This system 600 is similar to the system 500 shown in FIG. 5, but speech recognition capability has been added. Accordingly, the reference numbers used to identify the elements of system 600 are the same that are used to identify the corresponding elements of system 500, except the most significant digit is a "6" instead of a "5". In this example, the telecommunications system 600 further includes a speech decoder 618 and an automatic speech recognition system 620.

In operation, the display telephone 602 sends data in packets, either directly (as in the case of keypress codes) or by encoding speech in the form of packets (in the case of voice communication or use of the visual interactive response system with spoken commands rather than keypresses). The data packets containing the caller's speech are transmitted to the speech decoder 618, which converts the packetized speech back into a stream of digitized speech and transmits it to the automatic speech recognition system 620. The speech is not necessarily transmitted in real-time, as is the case for voice conversations. Instead, if there is appropriate handshaking at the beginning of the call so that the Etherphone 602 and the visual interactive response system, when a user is connected to a visual interactive response system that allows spoken commands, any commands that are spoken are transmitted with a retransmission protocol, and the spoken input is not presented to the speech recognition system 620 until the speech decoder has decoded the entire speech command and has performed the appropriate error correction.

As was described above, the visual interactive response system, when necessary, connects to the database 608 to retrieve and/or store information. The database 608 may be running on the same machine as the Visual Interactive Response System, or it may run on a separate machine. In the latter case, it may be connected via an Ethernet, Intranet wide area network, Internet, or a dedicated or dial-up traditional communication line with modem.

Figure 7:
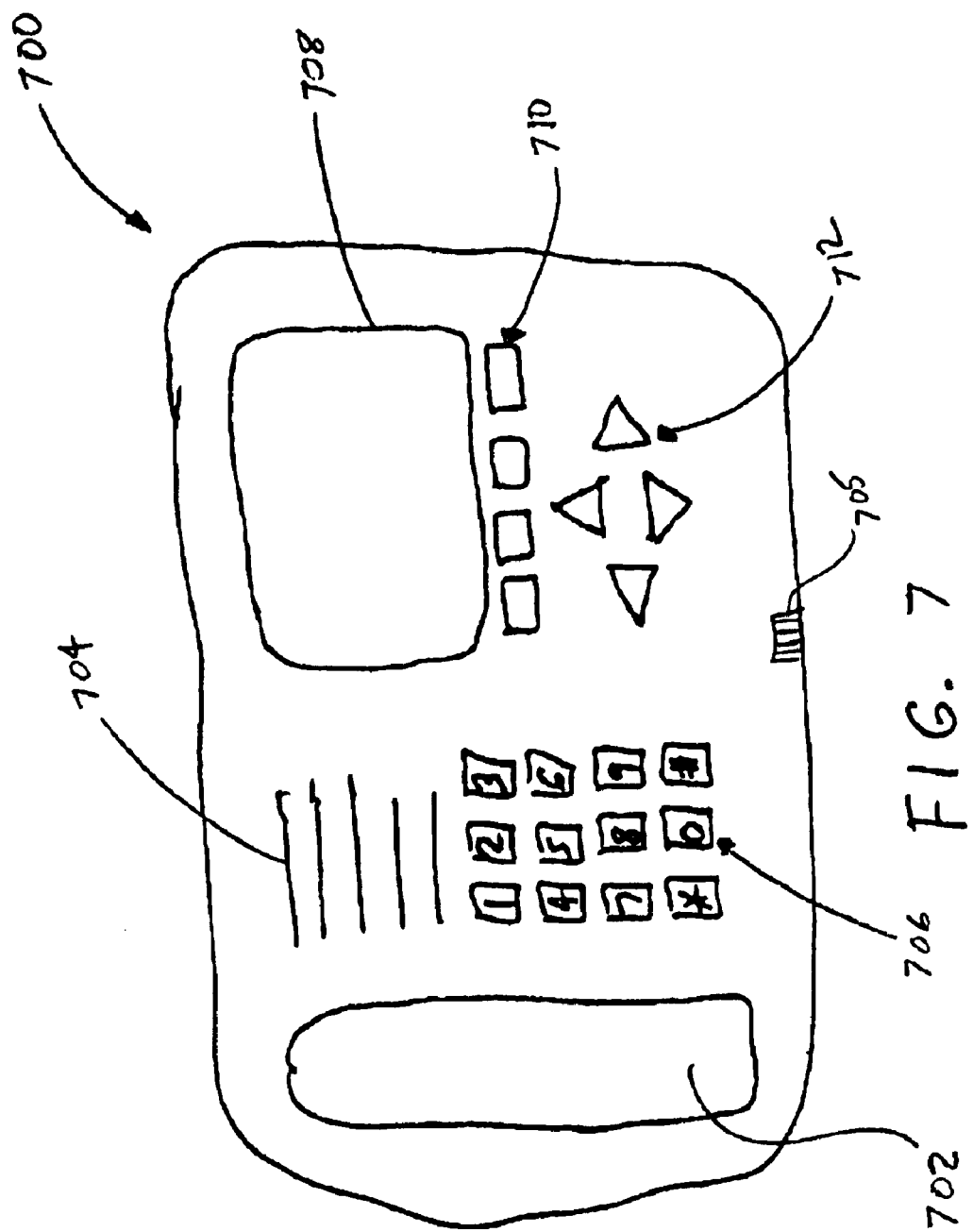
FIG. 7 illustrates a functional block diagram of an exemplary display telephone intended for consumer and small-business use.

FIG. 7 illustrates an exemplary display telephone 700 which can be used to communicate with the visual interactive response system in accordance with the invention. An example of a display telephone 700 is the Nortel Networks model i2004 Etherphone. However, other display telephones can be used to communicate with the visual interactive response system, including display telephones designed for consumer or small business use, or cellular telephones that have displays.

The display telephone comprises a handset 702, a speaker 704 and microphone 705 for speakerphone use, a key pad 706 for dialing a telephone number or other alphanumeric code for accessing a visual interactive response system, and a display 708. The display telephone 700 further includes "soft keys" 710 which can be situated below the display (and/or sometimes to the sides or above the display). The soft keys 710 can be associated with labels that are presented on the display, and can change the display for different contexts. The display telephone 700 further includes "arrow keys" 712 which can be situated below the soft keys 710 and allow navigation through the visual menu provided on the display 708. This is sometimes known, particular in the case of Nortel Networks telephones, as a "navigation bar" or "navigation keys".

Figure 8:
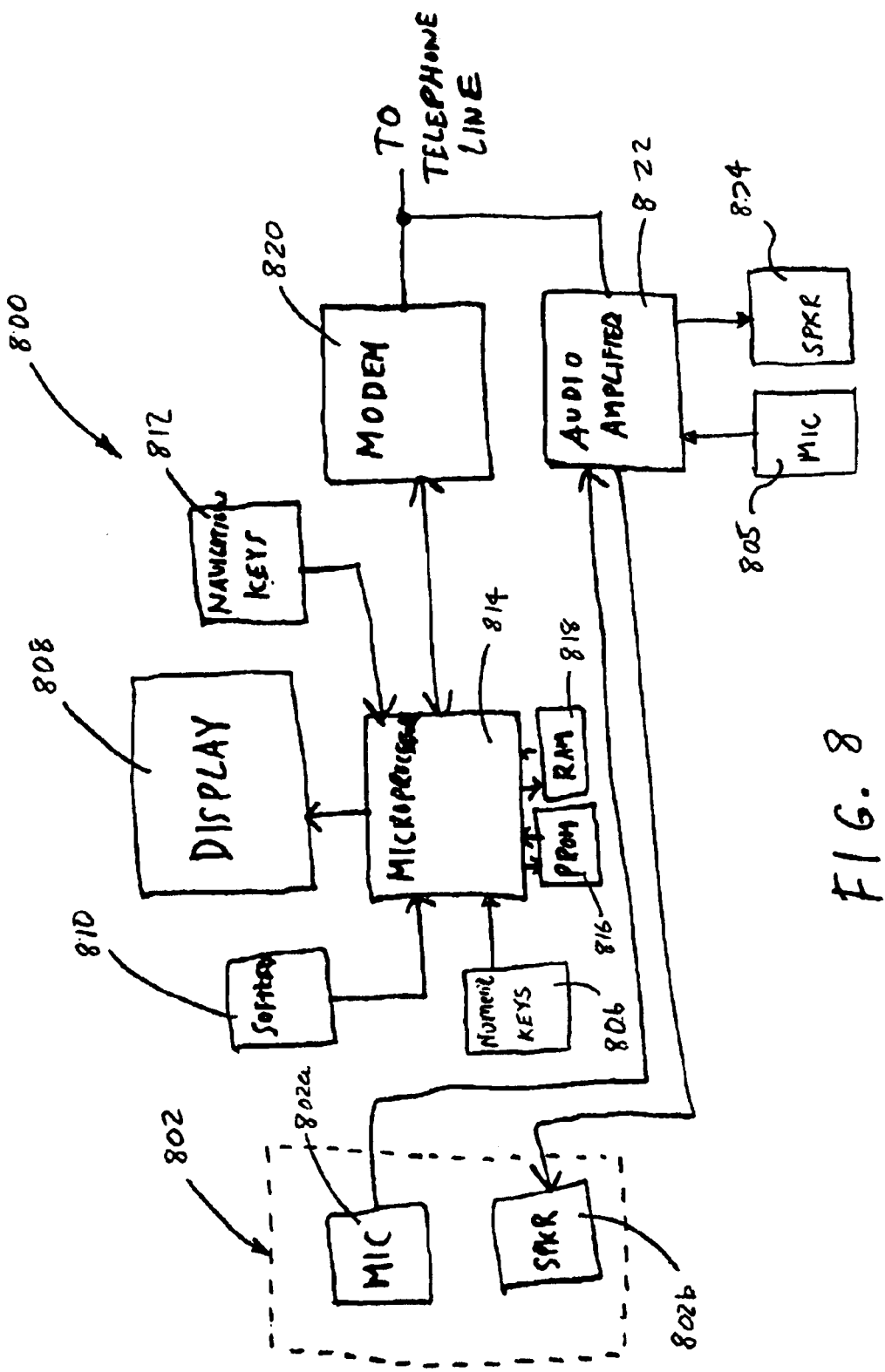
FIG. 8 illustrates a functional block diagram of an exemplary voice-to-visual interactive response translator in accordance with the invention.

FIG. 8 illustrates a functional block diagram of an exemplary display telephone 800 that can be used with the visual interactive response system in accordance with the invention. The display telephone 800 comprises a handset 802 which includes a microphone 802a and a speaker 802b, a speaker 804 and microphone 805 for speakerphone use, a standard telephone key pad 806, a display 808, soft keys 810, and navigation keys 812. The standard key pad 806, the display 808, the soft keys 810, and the navigation keys 812 are coupled to a microprocessor 814 which is connected to a programmable read-only-memory 816 (or, alternatively, flash memory) for permanently storing the software code for the operation of the display telephone 800 and a random-access-memory 818 for use in running the code. The display telephone 800 further comprises a modem 820 for communication with a visual interactive response system, and an audio amplifier 822 for amplifying the audio signals coming from the handset 802 and microphone 805, and the audio signal coming from the telephone line.

In operation, a user uses the standard key pad 806 to enter a telephone number associated with a visual interactive response system in accordance with the invention. The microprocessor 814 under the command of the software code senses the entry of the telephone number and then commands the modem 820 to establish a telephone connection with the server running the visual interactive response system. Once a telephone communication has been established, the microprocessor 814 transmits a code to the visual interactive response system that identifies the telephone 800 as being a "display" telephone. When the visual interactive response system receives this identification code, it sends data representing a visual menu to the microprocessor 814 which causes the visual menu to be displayed on the display 808. The user, using the soft keys 810 and/or the navigation keys 812, selects an item from the visual menu which is detected and coded by the microprocessor 814. The microprocessor 814 transmit the coded message of the selected key through the modem 820 to the visual interactive response system. The visual interactive response system then performs the task (including retrieval of information) assigned to the selected key.

Figure 9A:
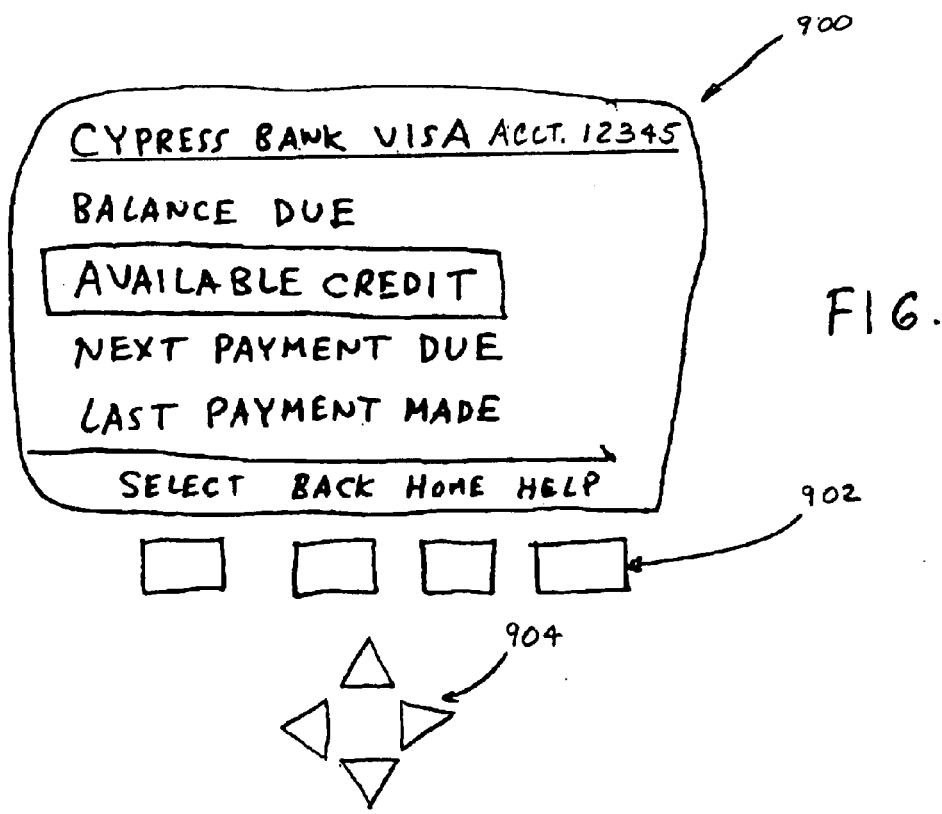
FIG. 9A illustrates an exemplary display screen on a telephone that presents a visual menu generated by a visual interactive response system in accordance with the invention.

FIG. 9A illustrates an exemplary display screen 900 on a display telephone that presents a visual menu 900 generated by a visual interactive response system in accordance with the invention. In this example, the visual interactive response system is used in a financial institution setting where customers can check the status of their credit card accounts. In this example, the visual menu includes the name of the account which is "Cypress Bank Visa Acct. 12345", and a plurality of selectable items, such as "Balance Due", "Available Credit", "Next Payment Due", and "Last Payment." The visual menu 900 further includes labels assigned to respective soft keys 902 on the display telephone, such as "Select", "Back", "Home", and "Help." Pressing the "Select" soft key 902 causes the selection of the menu item that is highlighted. Pressing the "Back" soft key 902 causes the previous screen visited to be displayed. Pressing the "Home" soft key 902 causes the system to go back to a default menu. Pressing the "Help" soft key 902 causes information to be displayed that explains the menu item(s).

A user can select one of the menu items by "highlighting" it using the navigation keys 904. The visual indicator representing that a menu item has been "highlighted" can be done in many ways, such as by displaying a box around the selected item, by displaying a symbol (e.g. an arrow pointing to the item) adjacent to the selected item, or by displaying the selected item in "reverse video". The visual menu 900 may also include an arrow or other symbol proximate the bottom of the visual menu 900 to indicate that additional selectable items are available, and using the navigation keys 904, a user can scroll down to view the additional items. In this example, the user pressed the "Select" soft key 902 and a code identifying that the "Available Credit" item is transmitted to the visual interactive response system.

Figure 9B:
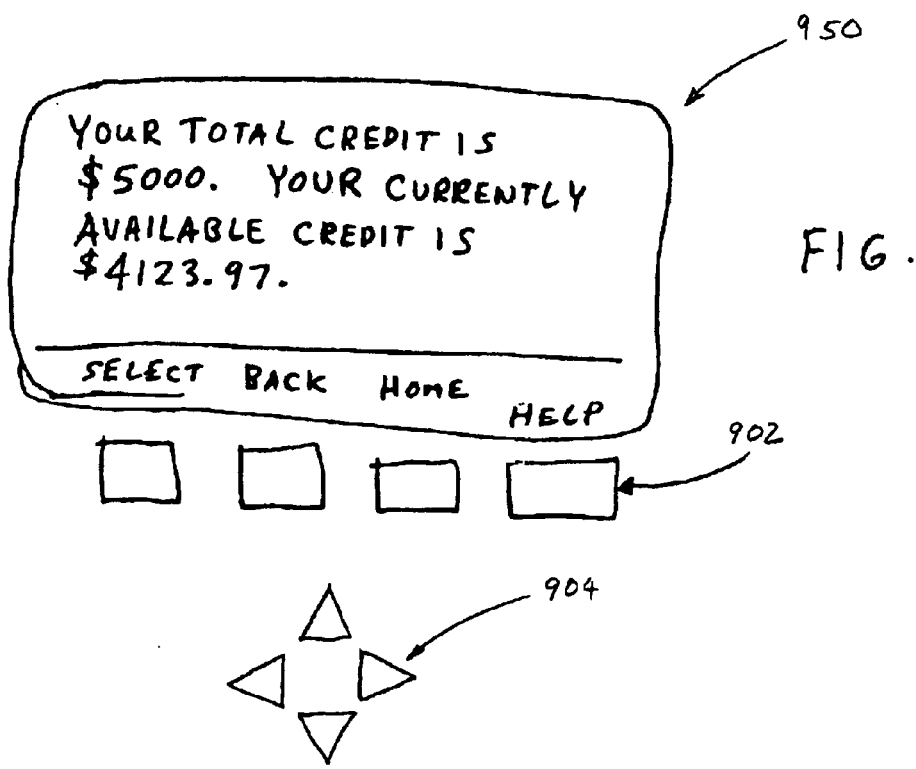
FIG. 9B illustrates the display illustrating an example visual response to the "Available Credit" selection transmitted back to the display telephone by the visual interactive response system.

FIG. 9B illustrates the display showing an example visual 950 response to the "Available Credit" selection transmitted back to the display telephone by the visual interactive response system. The visual response informs the user a total credit of $5000 and an available credit of $4123.97. The visual interactive response system accessed the user's personal information from a database coupled to the system. If more information existed than could be displayed, the arrow or other symbol near the bottom of the display can be activated by the user using the navigation keys 904 to scroll down to view the additional information. The visual interactive response system could also respond back with another menu added to the display. However, in this example, the screen is at a terminal point in the tree structure screen (menu) hierarchy without any selectable items. Thus, pressing "Select" soft key 902 causes the screen to return to the previous screen (same as pressing "Back"). The above example is merely shown for illustrative purposes, and the scope of the invention is not limited to this particular example.

Figure 10:
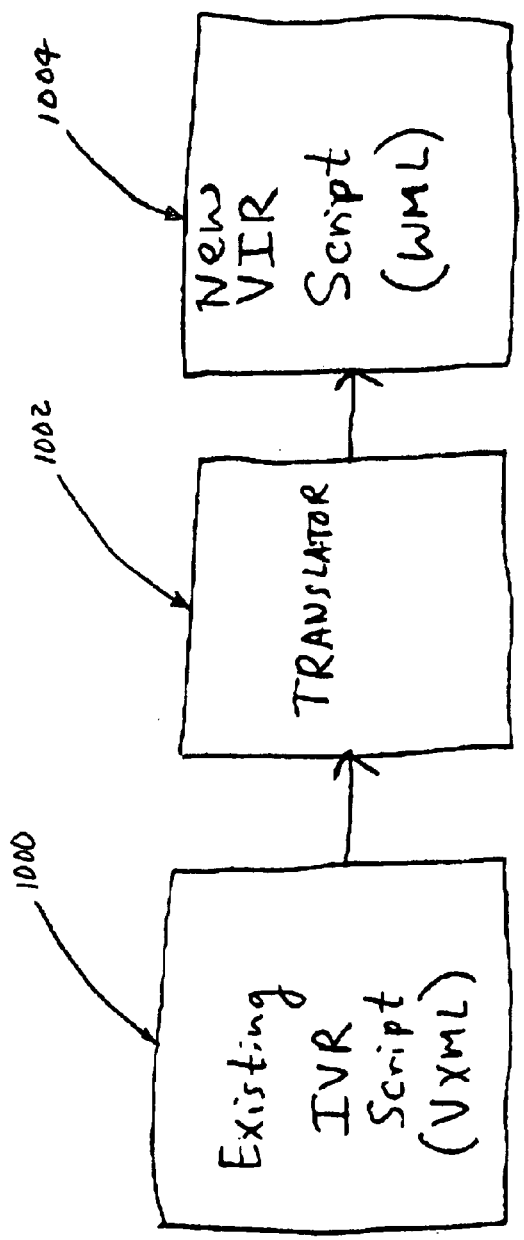
FIG. 10 illustrates a block diagram of an exemplary voice-to-visual interactive response translator in accordance with the invention.

FIG. 10 illustrates a functional block diagram of an exemplary voice-to-visual interactive response translator 1002 in accordance with the invention. The voice-to-visual interactive response translator 1002 receives as an input a script 1000 that defines a voice menu of an existing interactive voice response (IVR) system. The voice menu script 1000 is typically a software program/routine that presents a voice menu to a caller by accessing recorded messages, and performs various assigned functions in response to detected selections made by the caller on a telephone touch-tone dial pad. The voice menu script 1000 may have been written in many formats, including Voice eXtensible. Markup Language (VXML). Voice eXtensible Markup Language is an industry standard language for defining interactive voice response systems, including the voice menus, the function performed in response to selections made from a telephone keypad, and even in response to spoken commands.

The voice-to-visual interactive response translator 1002 receives the voice menu script 1002 and translates it to a visual menu script 1004. The visual menu script 1004 may be written in many formats, including Wireless Markup Language (WML) or Hypertext Markup Language (HTML). Wireless Markup Language (WML) is an industry standard language that was designed for cellular telephones, two-way pagers, personal digital assistants, and other small devices. One of the goals of the Wireless Markup Language (WML) is not directed at the wireless nature of the devices per se, but toward the fact that many devices have small displays and simple input capabilities. Wireless Markup Language (WML) is quite similar in form to Hypertext Markup Language (HTML), the language used for conventional Web browsing with such browsers as Internet Explorer and Netscape Navigator. Where Wireless Markup Language (WML) differs from Hypertext Markup Language (HTML) is in its text rather than graphic orientation and its navigation by the user through "cards" in a "deck" rather than pages, the strategy considered more appropriate for devices with very small displays.

Figure 11:
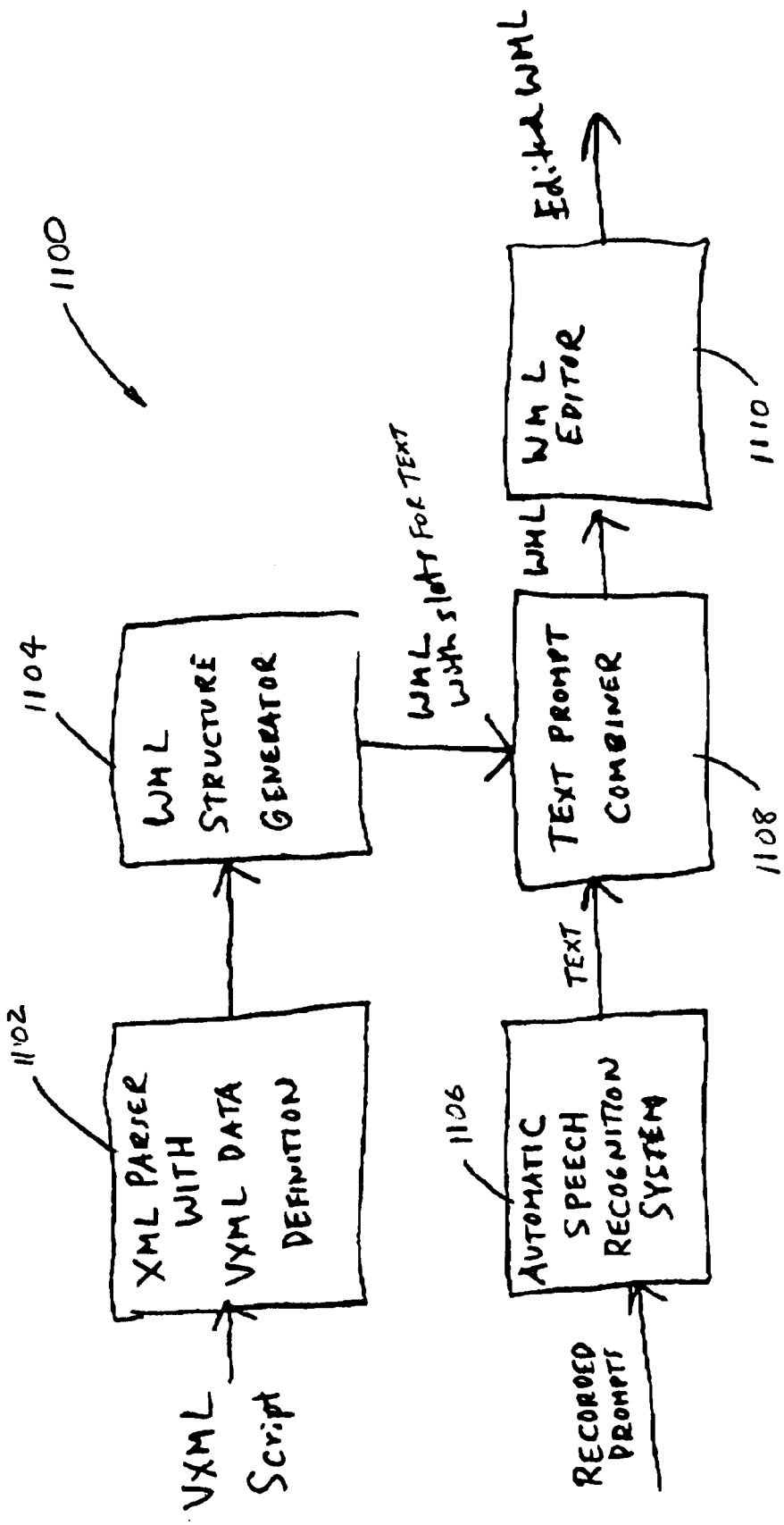
FIG. 11 illustrates exemplary files at various stages in the translation from a voice menu script in Voice eXtensible Markup Language (VXML) to a visual menu scropt in Wireless Markup Language (WML) format.

FIG. 11 illustrates a block diagram of an exemplary voice-to-visual interactive response translator 1100 in accordance with the invention. The translator 1100 comprises a voice script language parser 1102, a visual script structure generator 1104, an automatic speech recognition system 1106, a text prompt combiner 1108, and a visual menu script editor 1100. The parser 1102 is typically a computer program designed to extract the command structure from a defined language. In this example, the parser 1102 receives a voice menu script such as in Voice eXtensible Markup Language (VXML) and extracts the voice menu command structure of the script. Since Voice eXtensible Markup Language (VXML) is written in eXtensible Markup Language (XML), a language for tagging information, it can be parsed by a standard XML parser, given that a definition (known as a "data definition") is provided in the VXML.

The extracted command structure of the voice menu script generated by the parser 1102 is sent to the visual script structure generator 1104. The visual script structure generator 1104 creates an appropriate application definition using the higher-level description provided by the parser. Thus, it creates a hierarchy of menus, the menus themselves, and slots for the addition of text corresponding to the voice prompts. Since in this example the voice menu script is being converted from Voice eXtensible Markup Language (VXML) to Wireless Markup Language (WML), a Wireless Markup Language (WML) visual script with text slots is produced by the structure generator 1104.

Recorded speech from an interactive voice response system is provided to the automatic speech recognition system 1106. The automatic speech recognition system 1106 converts the speech into text. There are many types of automatic speech recognition system 1106, including those that run on a personal computer that do general purpose dictation. Some examples include the Dragon Systems DragonDictate, IBM's ViaVoice, systems by Learnout and Hauspie, and others. Note that although in many situations such systems have questionable performance in terms of accuracy, conversion of recorded speech into text will in most cases have a very high accuracy. This is because such recorded speech is typically recorded by a professional announcer that is a native speaker of the language (and, in the United States, usually has a "Midwestern" accent, which is to say essentially no accent at all). In addition, such speakers take pains to clearly enunciate the speech so that human listeners can easily understand it. Finally, such recordings are done in a studio with good acoustics, a high-quality microphone, and no background noise. Under such conditions, accuracy of even high-vocabulary speech recognition systems is typically 99% to 100% correct. In an alternative embodiment, an automatic speech recognition system is not used and the speech prompts are transcribed by a human.

The translated text is sent to the text prompt combiner 1108, which incorporates the translated text into the appropriate slots of the visual menu script created by the structure generator 1104. Accordingly, the text prompt combiner 1108 produces a completed visual menu script, such as in Wireless Markup Language (WML) format. The resulting visual menu script, if desired, may be sent to the editor 1110, which allows a human to modify the resulting visual menu script. Such an editor 1110 can range from a simple text-oriented editor that deals only with the ASCII text of the visual menu script (e.g. WML), to a specially designed editor that knows the syntax and structure of Wireless Markup Language (WML) format, or a visually oriented editor that not only knows the syntax and structure of Wireless Markup Language WML, but also has knowledge about visual interactive response systems.

The editor is optional in this system, but desirable in many situations. While it is useful to have completely automated translators from Interactive voice response system to visual interactive response system so that the very large number of existing voice systems can be made accessible to users with desktops and cellular display telephones, it is desirable to edit the wording and in some cases reorganize the menu structure to optimize the application for the visual modality. A goal of the system of the invention is to provide a mechanism that allows either completely automated translation, or translation with minor or major modification by a human editor, all depending upon the situation.

Figure 12:
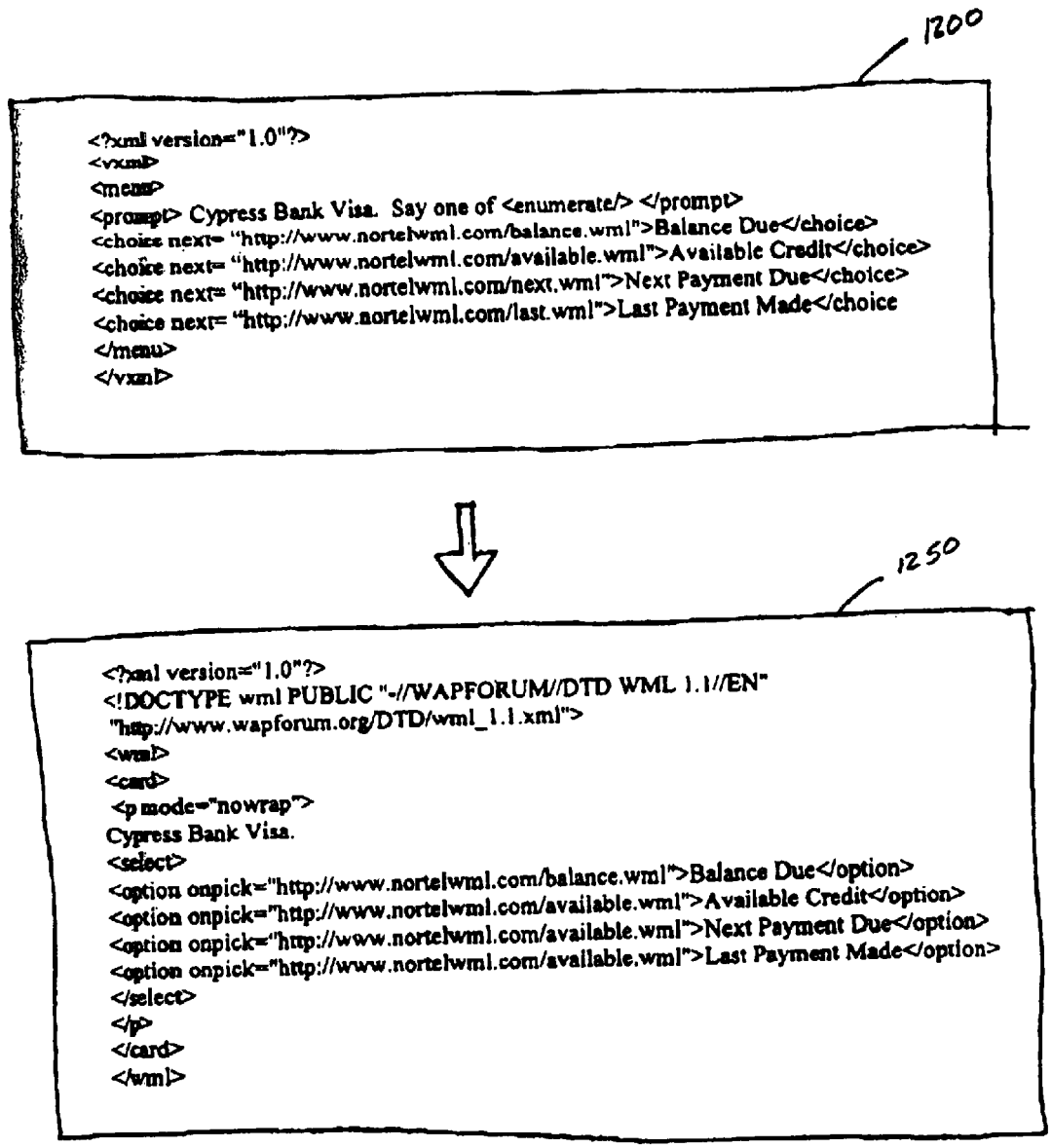
FIG. 12 illustrates an exemplary translation of a script in an interactive voice response language to a script in a visual interactive response language.

FIG. 12 illustrates an exemplary translation of a script 1200 in an interactive voice response language to a script 1250 in a visual interactive response language. In this example, the interactive voice response language is Voice Extensible Markup Language, also known as "VoiceXML" and as "VXML". VoiceXML is a language that is designed for creating audio dialogs for interactive voice response systems. This includes systems that use the telephone keypad as a response mechanism and systems in which the user speaks and the interactive voice response system uses an automatic speech recognition system to determine the user's response.

Responses provided from the system to the user may be prerecorded speech or synthesized speech generated by an automatic text-to-speech synthesizer. The example shown in FIG. 12 involves a VoiceXML application written for use with an automatic speech recognition system and with synthesized speech. The same principles for the translator apply, however, to other forms.

VoiceXML is a language designed for the specific application area of interactive voice response systems which is itself written in Extensible Markup Language, or XML. The VoiceXML language is used here as an example of a script for an interactive voice response system, and the translation process described is also applicable to scripts written in other languages associated with specific voice response systems developed by manufacturers such as Nortel Networks and others.

The output of the translator is shown as Wireless Markup Language, but this can be any language capable of representing visually the information, including the Web Clipping application representation developed by Palm Computer, Handheld Device Markup Language (HDML), HyperText Markup Language (HTML), or other languages.

In the example shown in FIG. 12, the translator parses the VoiceXML script 1200 looking for specific XML and VXML structures of interest. When the structure <?xml version="1.0"?> is found, for example, it is copied to the output 1250, and it also triggers the transmission to the output 1250 of the two lines beginning with the "<!DOC-TYPE" command, which indicates the version of WML being translated to (Version 1.1 in the example) and also a reference to the document definition in XML defining that version of WML, which is available on the Web.

The command "<vxml>" in the VXML script 1200 is understandably translated to "<wml>", and the parser then searches for specific VXML structures so that they can be translated to WML. The example here shows only the translation of a menu and associated prompts, but the translator can also search for input forms in VXML and translate them to WML. The translator may implement all of VXML and translate it to WML, or it may choose to only implement a subset of VXML. In the latter case it can be applied only to certain kinds of VXML applications, or it can be part of a system in which most of the VXML is translated by machine but the source VXML, output WML, and an editor are made available to a human who edits the output.

In the example shown, the translator detects the start "<menu>" and end "</menu>" combination in the VXML script 1200, and then expects a "<prompt>" command with text, indicating a spoken prompt, followed by a sequence of menu items, indicated by the "<choice" commands. The translator processes the prompt to determine what should be carried over to WML and what should be removed as applicable only to the voice version. Thus, the translator has a list of syntax combinations that are equivalent to the example shown "Say one of <enumerate>"/, which may specifically include the VXML "<enumerate>" command or which may simply provide text that indicates the items that can be selected. (Note that the "<enumerate>" command is simply shorthand that has the system listing the prompts contained in the "<choice>" commands. Thus the system would, in the example shown, use a speech synthesizer to generate the prompt "Say one of Balance Due, Available Credit, Next Payment Due, or Last Payment Made." In the case of an interactive voice response system that used DTMF keys as responses rather than spoken commands, the prompt would be "Press one for Balance Due, two for Available Credit, three for Next Payment Due, and four for Last Payment Made".)

In the case shown, only the "Cypress Bank Visa" part of the prompt is carried over to the WML output. As part of putting out the menu, the system also puts out appropriate WML commands, including "<card>" (to define the menu as a single card in a WML deck), "<p mode=nowrap>", to indicate that a paragraph of text is coming, in this case in the form of lines in which words should not be wrapped around to the next line, and a "<select>, </select>" pair is put out, analogous to the "<menu>", "</menu>" combination in VXML, indicating that a sequence of menu items is included. In the case of each menu item, the translation is very straightforward, with the two parameters, a Uniform Resource Identifier for where the system is t6 go should the user select the indicated menu item, and an associated prompt, being extracted from the VXML form and inserted in the WML form, which has essentially identical syntax, with only the names ("option" vs "choice" and "onpick" vs "next") being different.

Once all of the menu items have been translated, the appropriate commands in WML are transmitted to close the menu ("</select>", "</p>", and "</card>") and a "</wml>"command is transmitted to signal the end of the WML document.

Figure 13:
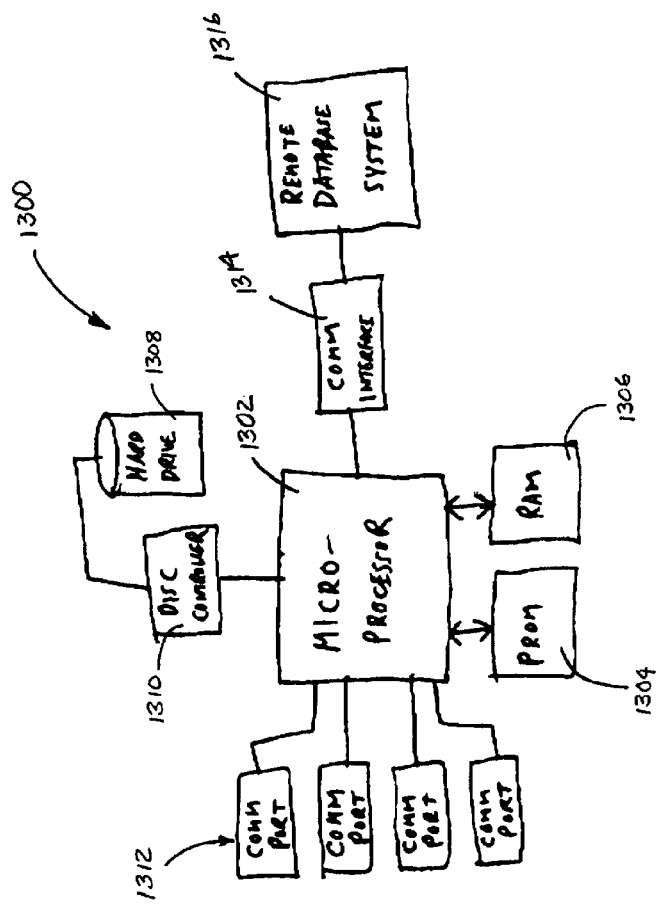
FIG. 13 illustrates a block diagram of an exemplary visual interactive response system in accordance with the invention.

FIG. 13 illustrates a block diagram of an exemplary visual interactive response system 1300 in accordance with the invention. The visual interactive response system 1300 comprises a microprocessor 1302, a programmable read only memory (PROM) 1304, a random access memory (RAM) 1306, a computer readable medium 1308 such as a hard disk (could also be a floppy drive, an optical storage disc, such as a compact disc, or digital versatile disc (DVD)), and a controller 1310 for the computer readable medium 1308. The visual interactive response system 1300 further includes one or more communications ports 1312 so that the visual interactive response system 1300 can communicate with one or more display telephones. Additionally, the visual interactive response system 1300 includes a communications interface 1314 for communication with a remote database system 1316.

In operation, communication ports 1312 receive calls from display telephones and modulate and demodulate signals from the display telephone, resulting in data supplied to (or generated from) the microprocessor 1302. The microprocessor 1302 is driven by a program residing in programmable read-only-memory (PROM) 1304 and also residing in random-access-memory (RAM) 1306. Typically, a program resides in RAM 1306 that implements a "browser" that carries out instructions in a visual-based script such as that in Wireless Markup Language, HyperText Markup Language, or similar. The visual-based script itself is typically kept on the hard disk drive 1308, accessed by the microprocessor 1302 via a disk controller 1310 and then loaded into RAM 1306 when being executed. The microprocessor 1302 is connected to the remote database system 1316 by means of communications interface, which may be a local communications interface 1314, a pair of modems and a communications link, or a communications interface to a local area network or wide area network such as the Internet.

Input from a display telephone is received at one of the communications ports 1312 and transferred to the microprocessor 1302, where the browser program executing in RAM 1306 interprets the visual-based script stored on the hard drive (and transferred when necessary to RAM) to determine a response. Generating such a response may also involve writing and/or accessing information to and/or from the remote database system 1316. When a response has been prepared it is transmitted back to the display telephone via one of the communications ports 1312.

Figure 14:
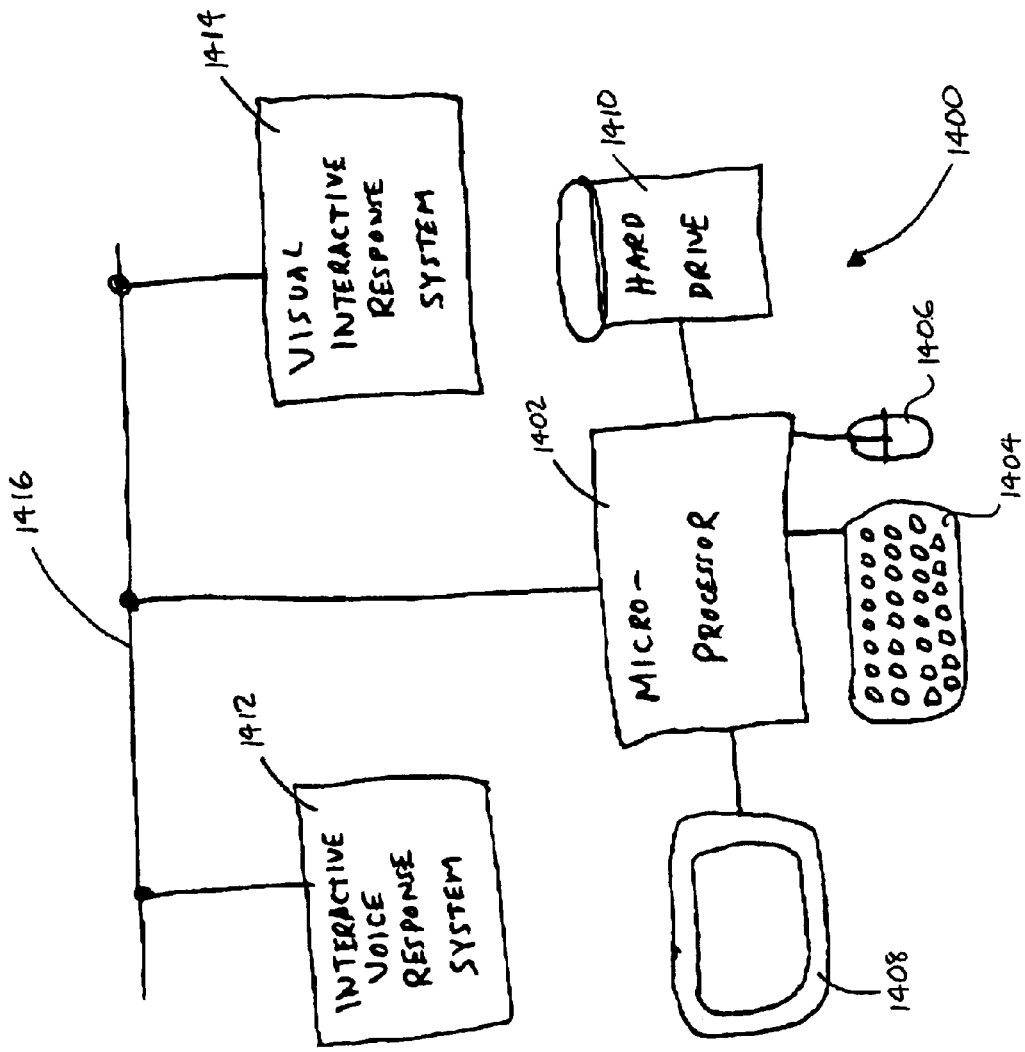
FIG. 14 illustrates a block diagram of a voice-to-visual interactive response translation system 1400 in accordance with the invention.

FIG. 14 illustrates a block diagram of a voice-to-visual interactive response translation system 1400 in accordance with the invention. The voice-to-visual interactive response system 1400 comprises a microprocessor 1402, user input devices such as keyboard 1404 and mouse 1406, a display 1408, and a computer readable medium 1410 such as a hard drive, a floppy disk, an optical disk such as a CD or DVD, etc., for storing the translation and editing program. The voice-to-visual interactive response system 1400 receives as an input a voice script (e.g. VXML) from an interactive voice response system 1412 and outputs a visual script (e.g. WML) to a visual interactive response system 1414. The voice-to-visual interactive response translation system 1400, the interactive voice response system 1412, and the visual interactive response system 1414 may be connected together via a communications link, such as a local area network 1416 which may be an Ethernet. The microprocessor may run on a Windows-based operating system, a Unix-link operating system such as Linux, or other suitable operating systems.

In operation, the interactive voice response system 1412 provides a voice-based script, in a language such as VoiceXML or others, which is transferred to the microprocessor 1402. A translating program controlling the microprocessor 1402 translates the voice-based script into a visual-based script. The visual-based script may be, as previously discussed, in Wireless Markup Language or in another language. An editing program may, if desired, control the microprocessor 1402 to allow a user to edit the translated visual-based script. The visual-based script is then transferred to the visual interactive response system 1414 and executed.

Typically, an operator will cause the translator 1400 to make a translation, storing the resulting file on the hard drive 1410, and then the operator will edit the new script using a traditional line-oriented editor. Often, the operator will perform the editing interactively, first performing obvious changes after translation, then actually testing the visual interactive response system 1414 by transferring the script to the VIR system and calling it with a display telephone, or by executing a simulation of a display telephone that operates on the screen (using the mouse and/or keyboard) of the translating/editing workstation 1400. The operator can then make changes to the script as appears desirable, transfer the script to the VIR system, and test it again.

The editor may be a separate program or incorporated into with the translation program. The editor may, during the translation process, ask the human operator to choose from various options. Such an editor may have a high degree of knowledge about the destination script language being developed and be able to help the operator make changes even if the operator has little knowledge of the language. The editor may also, instead of being a line-oriented editor, be a graphical oriented editor that allows the operator to make changes by "grabbing" icons on a screen and manipulating them, using the keyboard only to generate or edit output text. In the typical case most of the translation will be done by the automated system, but some editing is done by a human operator to optimize the length of words used in prompts or the exact wording used in prompts, both of which likely have different optimum choices in a visual modality than they would in an auditory modality.

The translating/editing workstation 1400 may also include software that translates spoken prompts (which are provided as part of the source script, typically in the form of audio files such as ".wav" files) into their text equivalent. Such software is commercially available as, for example, that sold by Dragon Systems, Philips, and IBM, and may be operated separately on the files and cut-and-pasted into the text fields of the destination script or a speech recognition system may be fully integrated into the translator and editor program. In the latter case the system will preferably allow the operator to listen to the audio files and modify the output text when desired.

The translation may also be accomplished in "real time", in a similar manner that an interpreter executes a high-level programming language, as oppose to compile it into machine language. In this case, when a user calls a visual interactive response system that is coupled to an interactive voice response system, and display telephone is detected, the visual interactive response system in "real time" translates the appropriate voice-based menu into visual format and sends it to the display telephone. The translated visual menu may be stored to eliminate the need to translate it again for subsequent users, or it can be discarded. If discarded, the system performs another "real time" translation of the same menu upon a subsequent user requesting it. The advantage with discarding the previously translated menu is that if the voice-based menu is updated, the "real time" translation incorporates the update. If the translated visual menu is stored, updates on the voice-based menu are not reflected in the corresponding visual-based menu.

In the foregoing specification, the invention has been described with reference to specific embodiments thereof. It will, however, be evident that various modifications and changes may be made thereto departing from the broader spirit and scope of the invention. The specification and drawings are, accordingly, to be regarded in an illustrative rather than a restrictive sense.

What is claimed is:

1. The computer readable medium comprising a translation software program for translating a voice-based script for an interactive voice response system to a visual-based script for a visual interactive response system, said translation software program comprises:
    a parser for extracting command structure from said voice-based script;
    a visual-based structure generator for generating an incomplete visual-based script with slots for text; and
    a text prompt combiner for incorporating text relating to voice prompts into said slots of said incomplete visual-based script.

2. The computer readable medium of claim 1, wherein said visual-based script is defined in wireless markup language.

3. The computer readable medium of claim 1, wherein said visual-based script is defined in wireless markup language.

4. The computer readable medium of claim 1, wherein said visual-based script is defined in hypertext markup language.

5. The computer readable medium of claim 1, wherein said visual-based script is defined in handheld device markup language.

6. The computer readable medium of claim 1, wherein said translation software program further includes an automatic speech recognition routine for automatically converting said voice prompts into said translated text.

7. The computer readable medium of claim 1, further including an editor for editing said visual-based script.

8. The computer readable medium of claim 1 wherein said voice prompts are in an audio format.

9. The computer readable medium of claim 1, wherein said translation occurs in real time in response to a request from a display telephone.

10. A computer system including a microprocessor running a translation software program for translating a voice-based script for an interactive voice response system to a visual-based script for a visual interactive response system, said translation software program comprises:
    a parser for extracting command structure from said voice-based script;

a visual-based structure generator for generating an incomplete visual-based script with slots for text; and a text prompt combiner for incorporating text relating to voice prompts into said slots of said incomplete visual-based script.

11. The computer system of claim 10, wherein said voice-based script is defined in voice extensible markup language.

12. The computer system of claim 10, wherein said visual-based script is defined in wireless markup language.

13. The computer system of claim 10, wherein said visual-based script is defined in hypertext markup language.

14. The computer system of claim 10, wherein said visual-based script is defined in handheld device markup language.

15. The computer system of claim 10, wherein said translation software program further includes an automatic speech recognition routine for automatically converting said voice prompts into translated text.

16. The computer system of claim 10, further including an editor for editing said visual-based script.

17. The computer system of claim 10, wherein said voice prompts are in an audio format.

18. The computer system of claim 10, wherein said translation occurs in real time in response to a request from a display telephone.

19. A method for translating a voice-based script for an interactive voice response system to a visual-based script for a visual interactive response system, said method comprising:

extracting command structure from said voice-based script;

generating an incomplete visual-based script with slots for text; and incorporating text relating to voice prompts into said slots of said incomplete visual-based script.

20. The method of claim 19, wherein said voice prompts are in an audio format.

21. The method of claim 19, wherein said voice-based script is defined in voice extensible markup language.

22. The method of claim 21, wherein said visual-based script is defined in wireless markup language.

23. The method of claim 19, wherein said visual-based script is defined in hypertext markup language.

24. The method of claim 19, wherein said visual-based script is defined in handheld device markup language.

25. The method of claim 19, wherein prior to incorporating the text, said method further comprises automatically converting said voice prompts into translated text.

26. The method of claim 19, wherein said translation of said voice-based script to said visual-based script occurs in real time in response to a request from a display telephone.

* * * * *